US007318234B1

(12) United States Patent
Dharmarajan

(10) Patent No.: US 7,318,234 B1
(45) Date of Patent: Jan. 8, 2008

(54) REQUEST PERSISTENCE DURING SESSION AUTHENTICATION

(75) Inventor: Baskaran Dharmarajan, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 807 days.

(21) Appl. No.: 10/081,755

(22) Filed: Feb. 19, 2002

(51) Int. Cl.
*H04L 29/00* (2006.01)
(52) U.S. Cl. ............... 726/2; 726/3; 726/4; 726/11; 726/12; 713/168; 713/170; 370/352; 370/401
(58) Field of Classification Search ............... 726/2, 726/9–12, 17, 20–21, 4; 713/182–183, 185, 713/155, 170, 172, 168; 705/67, 78; 370/352, 370/401
See application file for complete search history.

(56) References Cited

U.S. PATENT DOCUMENTS 5,655,077 A    8/1997   Jones et al. ............... 726/8
6,088,799 A    7/2000   Morgan et al. ............ 713/182
6,487,667 B1*  11/2002  Brown ....................... 726/7
6,678,733 B1*  1/2004   Brown et al. .............. 709/229
2002/0023122 A1* 2/2002  Polizzi et al. ............. 709/202
2002/0112083 A1* 8/2002  Joshi et al. ................ 709/248

OTHER PUBLICATIONS

Daniel Treplin and Edelgard Eberlein, "No Access for the Unauthorized (PC Security Packages)," Personal Computer No. 4, Apr. 1990, pp. 143-145, 147.
Stephen Keung & Kai-Yeung Siu, "Efficient Protocols Secure Against Guessing and Replay Attacks," Dept. of Electrical & Computer Engineering, University of California, Irvine, CA 92717, 1995 IEEE, pp. 105-112.
Linda R. Garceau & Peter F. Poznanski, "How Safe is Your Lan?", CMA Magazine, Apr. 1995, pp. 8-11.

* cited by examiner

*Primary Examiner*—Kambiz Zand
*Assistant Examiner*—Tongoc Tran
(74) *Attorney, Agent, or Firm*—Lee & Hayes, PLLC

(57) ABSTRACT

A system receives a request from a client and verifies that the client is authenticated. If the client is not authenticated, the system maintains the request and directs the client to obtain authentication. After verifying that the client has obtained valid authentication, the authentication system processes the saved request.

29 Claims, 4 Drawing Sheets

REQUEST PERSISTENCE DURING SESSION AUTHENTICATION

TECHNICAL FIELD

This invention relates to client-server sessions and, in particular, to maintaining a request during session authorization.

BACKGROUND

Many web sites implement security by way of encrypted authentication tokens placed on the client as browser cookies. Many of the sites have a session time, after which the authentication tokens become invalid and require that the user re-submit a password to restore the session. This can be very disruptive to the user. For example, a user composing an email message will not be aware that the authentication token has expired. When the user subsequently attempts to submit the email message, the user will be prompted with a "Re-enter your password" page. Not only will the disruption preclude the email message from being sent, but the user will also have to re-create the email message.

To decrease the potential for such a disruption, some web sites have implemented "rolling time windows." This means, if a user's session time is two hours, and there is no session activity for the two hours, then before the next request is processed, the user will be prompted to re-authenticate by providing a password again. However, this approach poses a security problem. It is possible for someone to steal a user's cookies containing the encrypted authentication tokens, and thus, the user's identity. The thief can then infinitely maintain the user's identity by simply executing a script to automatically refresh a page or perform some other session activity at regular intervals that are less than the session time-out period.

SUMMARY

Systems and methods for keeping a request persistent during session authentication are described. A session authentication system verifies that a client has been authenticated before processing a request submitted by the client. When the system receives a request from a client and cannot verify that the client has been authenticated, the system maintains the request and re-directs the client to obtain valid authentication. Upon verification that the client has been authenticated, the system processes the maintained request.

BRIEF DESCRIPTION OF THE DRAWINGS

The same numbers are used throughout the drawings to reference like features and components.

DETAILED DESCRIPTION

The following describes systems and methods that persist, or otherwise maintain, a client request during session authentication. A re-authentication system implemented on a server computer system provides increased security without disrupting user workflow in a client-server environment. When a request is submitted from the client to the server, the re-authentication system verifies that the session is secure. If the re-authentication system cannot verify that the session is secure, the system persists (e.g., saves or maintains) the request and directs the client to re-authenticate the session. When the client session is re-established, the re-authentication system directs the server to process the saved request, instead of requiring that the request be re-submitted from the client.

For example, an application server may host an Internet-based email application. Users may log in with a username and password, and then send and receive email over the Internet. Without a session re-authentication system in place, a user may lose an unsent email message if the user's login expires while the user is composing the message, but before the user sends the message. On the other hand, if the application server that hosts the Internet-based email application is implemented with a session re-authentication system, the message is not lost. If the user's login has expired, the unsent email message is saved and the user is given an opportunity to login again. After a successful login, the saved email message is automatically sent, as previously requested by the user.

Figure 1:
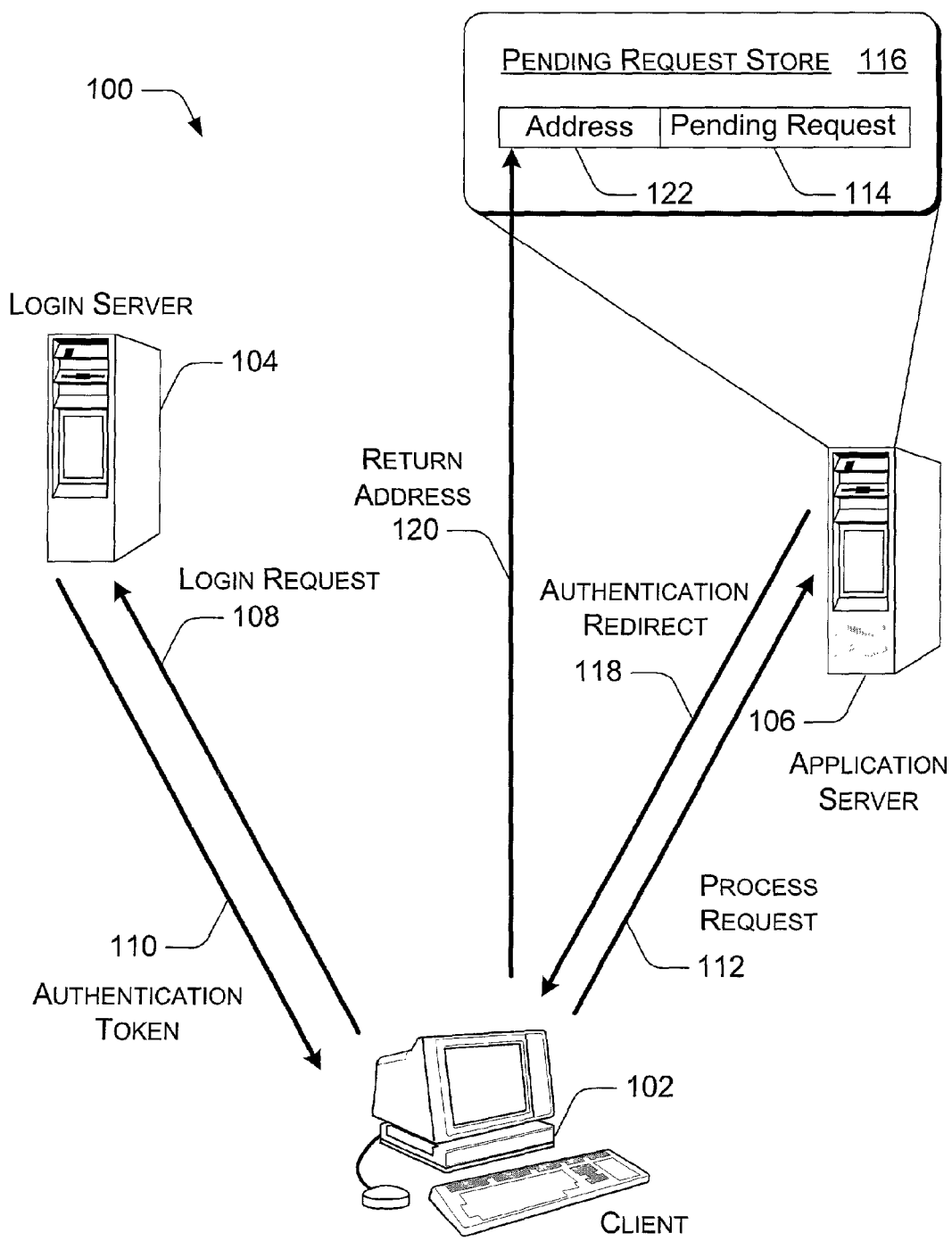
FIG. 1 illustrates example communications between a client computer system, a login server, and an application server, to perform session re-authentication.

FIG. 1 illustrates example communications between devices to perform session re-authentication in an authentication environment 100 which includes a client computer system 102, a login server 104, and an application server 106. Although FIG. 1 depicts the login server 104 and the application server 106 as physically separate systems, it is recognized that functions performed by the two devices may be performed by the same server system.

Client computer system 102 submits login request 108 to login server 104. After verifying the client identity (e.g., a submitted username and password), login server 104 provides client computer system 102 with authentication token 110, such as a cookie, to be stored on the client. After obtaining a valid authentication token, client computer system 102 submits process request 112 to application server 106. The process request may be, for example, a request to send an email message composed using an Internet-based email application maintained on the application server. Application server 106 verifies that the session between client computer system 102 and application server 106 has been authenticated, and then processes the process request. For example, application server 106 may verify that the session has been authenticated by examining the client's authentication token. In one implementation, a copy of the authentication token may be sent to the application server as part of the process request. In another implementation, the application server may access the authentication token stored on the client computer system to determine whether or not the authentication token is valid.

To enhance session security, authentication token 110 provided by login server 104 may expire after a period of time. For example, a session may be considered no longer secure if two hours have passed since the client last obtained 19 an authentication token from the login server.

When application server 106 receives process request 112 from client computer system 102 and is unable to verify that the client-server session has been authenticated (e.g., the client's authentication token is missing, has expired, or is otherwise not valid), application server 106 saves process request 112 as pending request 114 in a pending request store 116. Application server 106 then generates and sends an authentication redirect 118 to client computer system 102. Authentication redirect 118 contains information that will direct client computer system 102 to request a valid authentication token and also contains a return address 120 that is associated with an address 122 of stored pending request 114.

In one implementation, return address 120 is a URL (uniform resource locator) and is generated based on address 122, which is associated with pending request 114. Authentication redirect 118 directs client computer system 102 to send a second login request 108 to login server 104. As described above, after verifying the client identity (e.g., a submitted username and password), login server 104 provides client computer system 102 with a valid authentication token 110. After client computer system 102 obtains the valid authentication token 110, authentication redirect 118 directs client computer system 102 to access the stored pending request 114 through return address 120. Application server 106 then verifies the client's authentication token 110 and processes pending request 114.

Figure 2:
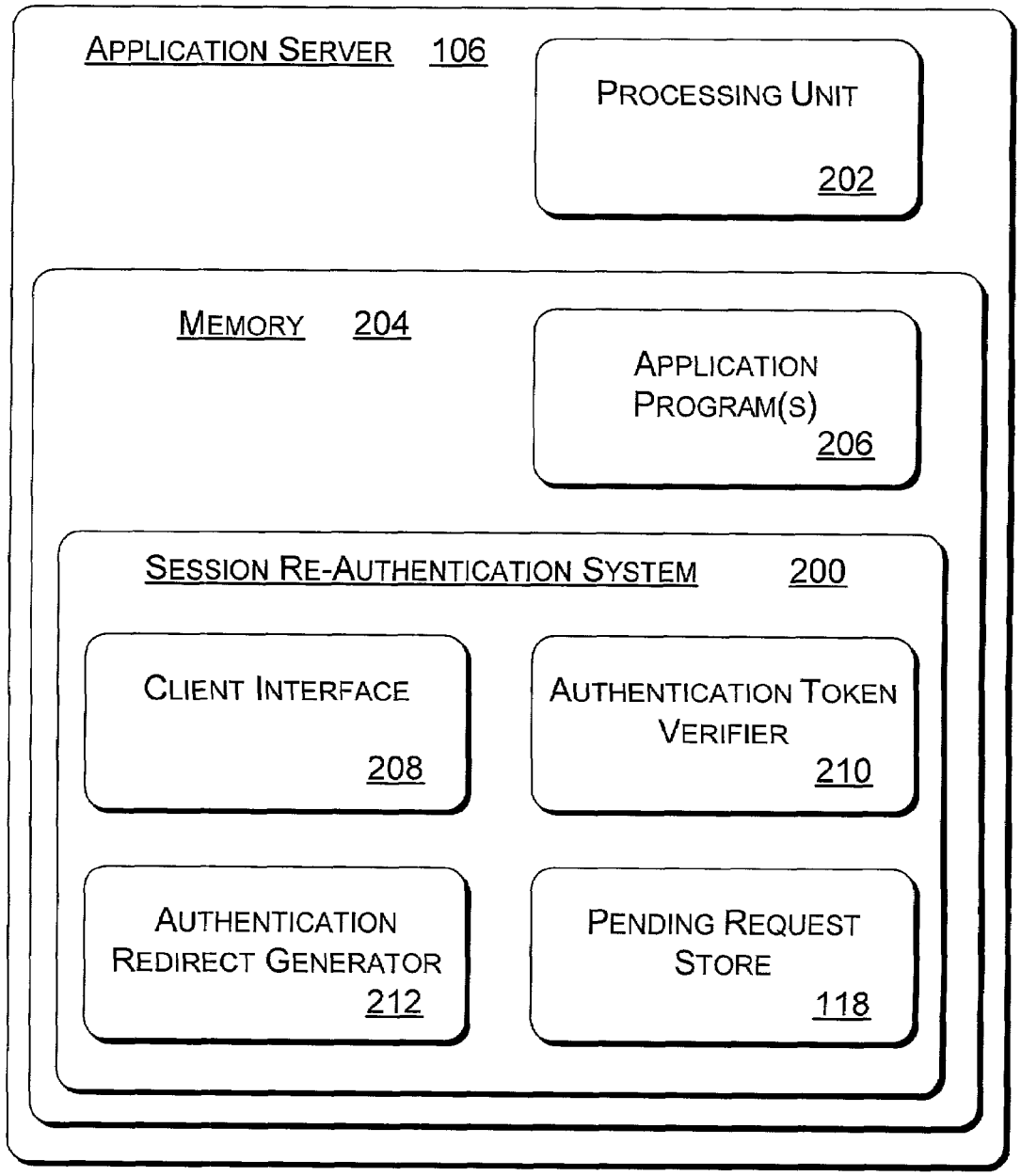
FIG. 2 is an example block diagram of a session re-authentication system implemented in an application server.

FIG. 2 shows an exemplary session re-authentication system 200 implemented at application server 106, which includes a processing unit 202 and a memory 204. The session re-authentication system 200 is implemented in memory 204 along with one or more application program(s) 206. Processing unit 202 processes requests from the client, either when a process request is received and the client authentication token is deemed valid, or after a process request is saved and a valid authentication token is subsequently verified.

Session re-authentication system 200 includes a client interface 208 that facilitates communication between session re-authentication system 200 and client computer system 102 using a communication protocol (e.g., HTTP). Session re-authentication system 200 also includes an authentication token verifier 210, an authentication redirect generator 212, and the pending request store 116.

The authentication token verifier 210 verifies that that the client has a valid authentication token when the client submits a request. Authentication token 110 is provided to client computer system 102 by login server 104 (FIG. 1). The verification performed by authentication token verifier 210 may include verifying that the username associated with authentication token 110 matches the username associated with client computer system 102. Additionally, authentication token verifier 210 may verify that authentication token 110 has not expired based on an expiration time assigned by login server 104 and associated with authentication token 110. Authentication token verifier 210 may also use other criteria to determine whether the authentication token 110 is valid. Examples of other criteria that may be used to determine whether the authentication token is valid include, whether the account is associated with previous violations of terms of a service agreement; whether the account is associated with a minor, and in such a case, whether the minor has sufficient permission from a parent; and whether the account has been terminated due to lack of use over a period of time, and therefore needs to be recreated.

The pending request store 116 stores process request 112 as pending request 114 when authentication token verifier 210 determines that the authentication token associated with the client is invalid. In one implementation, the pending request may be stored as a file. In an alternate implementation, the pending request may be stored as a database file. In another alternate implementation, the request may be encoded and persisted as a set of cookies if the total size does not exceed the protocol limits, thus saving back-end write-read-delete round trips for a 3 tiered internet system utilizing file or database based back-ends. A stored pending request 114 is associated with the address 122 that is used to generate return address 120 as part of a redirect operation described below.

The authentication redirect generator 212 creates authentication redirect 118 to instruct the client to obtain a valid authentication token and access the stored pending request. Authentication redirect 118 directs client computer system 102 to submit login request 108 (FIG. 1) to login server 104. After the login server provides authentication token 110, the authentication redirect 118 uses return address 120 to direct the client to access the address 122 associated with stored pending request 114, which in turn causes application server 106 to process stored pending request 114.

Figure 3:
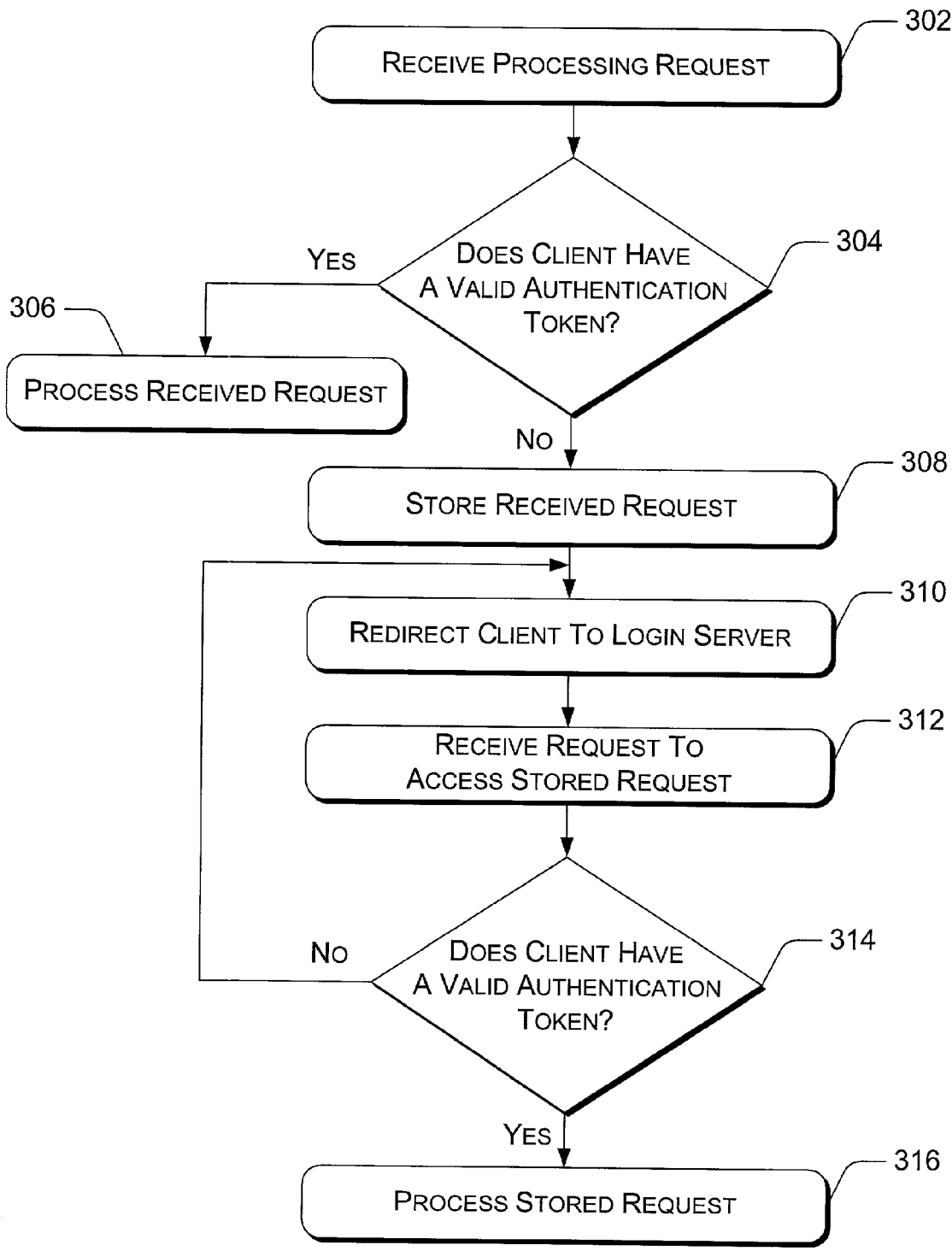
FIG. 3 is an example flow diagram of session authentication performed by a session re-authentication system.

FIG. 3 illustrates a session authentication process. The session authentication process is illustrated as a set of operations shown as discrete blocks. The process may be implemented in any suitable hardware, software, firmware, or combination thereof. The order in which the operations are described is not to be construed as a limitation.

At block 302, a session re-authentication system receives a process request from a client. For example, re-authentication system 200 (implemented as part of application server 106) receives process request 112 from client computer system 102 (FIG. 1). The process request is received through client interface 208 of re-authentication system 200 (FIG. 2).

At block 304, the re-authentication system determines whether the client has a valid authentication token. For example, authentication token verifier 210 of session re-authentication system 200 determines whether an expiration time period associated with the client's authentication token has passed. Although this implementation is described with reference to a time-based expiration, it is recognized that other criteria may be used to verify the validity of an authentication token, such as the version of a key used to encrypt the token. For example, if the login server currently encrypts authentication tokens using version three of an encryption key and the re-authentication system detects an authentication token encrypted with version two of the encryption key, the re-authentication system determines that the authentication token encrypted with version two of the encryption key is invalid.

If the re-authentication system determines that the client has a valid authentication token (i.e., "yes" from block 304), the application server processes the received request at block 306. On the other hand, when the re-authentication system determines that the client does not have a valid authentication token (i.e., "no" from block 304), the re-authentication system stores the received request at block 308. The request is stored, for example, in pending request store 116 described above with reference to FIG. 2. As described above, an address is associated with the stored request.

At block 310, the re-authentication system redirects the client to the login server to obtain a valid authentication token. The redirection instruction is generated, for example, by authentication redirect generator 212 of session re-authentication system 200.

Based on the return address that is included as part of the generated redirect, the re-authentication system receives a request from the client to access the stored request at block 312. For example, client computer system 102 is directed by way of return address 120 to stored pending request 114 (FIG. 1).

At block 314, the re-authentication system determines whether the client has a valid authentication token. If the re-authentication system determines that the client does not have a valid authentication token, (i.e., "no" from block 314), the process continues as described above, at block 310. On the other hand, when the re-authentication system determines that the client does have a valid authentication token (i.e., "yes" from block 314), the application server processes the stored pending request, such as pending request 114.

Figure 4:
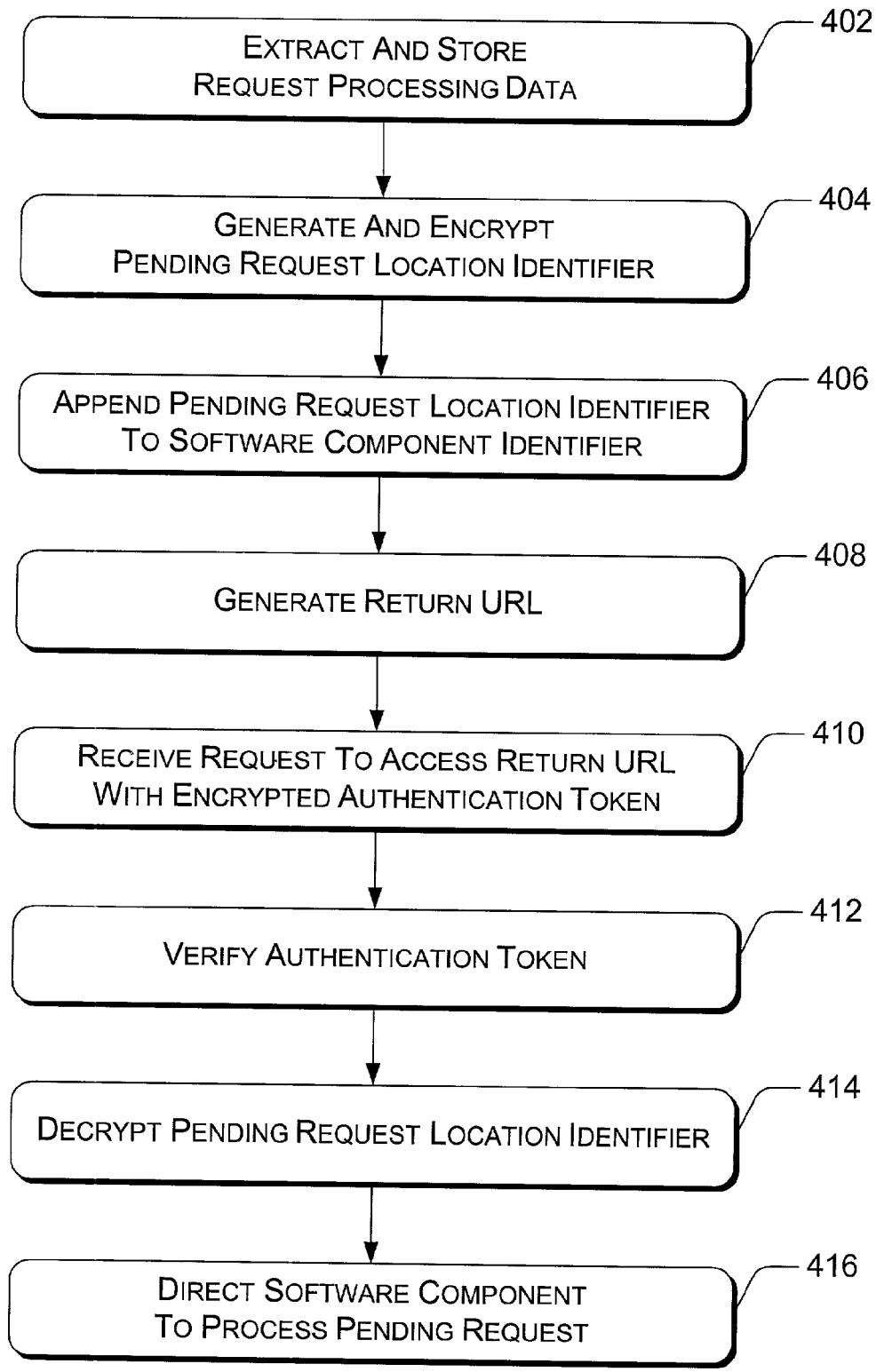
FIG. 4 is an example flow diagram of client redirection performed by an example session re-authentication system given an example process request.

FIG. 4 illustrates a client redirection process performed by an example session re-authentication system given an example process request associated with an invalid authentication token. The process request of this example is a process request to send a composed email message. The request is directed to an email software application component on the application server. In this example implementation, the encrypted authentication token is sent to the application server as part of the request. When the session re-authentication system determines that the authentication token associated with the received request is invalid, the session re-authentication system begins the client re-direction process.

At block 402, the example session re-authentication system extracts information from the request that will be necessary to process the request at a later time. The session re-authentication system stores the extracted information in the pending request store. For example, given the example process request to send a composed email message, the name of the email application component to which the request was directed and the contents of the email message are stored in the pending request store. For example, the information extracted from the request is stored in a file on a storage device associated with the application server. The name of the file in which the request is stored may be randomly generated.

At block 404, a redirect generator component of the example session re-authentication system generates and encrypts a pending request location identifier. The pending request location identifier is associated with the file in which the information extracted from the process request is stored and contains the information necessary for the application server to locate the file at a later time.

At block 406, the redirect generator appends the encrypted pending request location identifier to a software component identifier. In this example, the software component identifier indicates the email software application component to which the original request was directed.

The application server is associated with an address, for example, a URL. At block 408, the redirect generator appends the software component identifier and encrypted pending request location identifier to the URL associated with the application server, generating a return URL that will direct the client back to the stored pending request.

As described with reference to block 310 of FIG. 3, the session re-authentication server then sends a redirect instruction to the client, which includes the generated return URL as a parameter. The redirect instruction directs the client to the login server to obtain a valid authentication token. The login server authenticates the user and generates a valid authentication token. At block 410, the session re-authentication system receives a request from the client to access the return URL. The request is in the form of the return URL with the valid authentication token appended to the end.

At block 412, the re-authentication system verifies that the received authentication token is valid.

At block 414, the session re-authentication system decrypts the pending request location identifier that is embedded in the return URL.

At block 416, the session re-authentication system directs the software component identified in the return URL (for example, the email software application component to which the original request was directed) to process the request stored at the location indicated by the decrypted pending request location identifier.

CONCLUSION

Although the systems and methods have been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method comprising:
   establishing a session between a server and a client;
   authenticating the session,
   subsequent to authenticating the session, receiving at the server, via the session, a request from the client;
   subsequent to receiving at the server, the request from the client, determining whether the session is still authenticated; and
   in an event that the session is no longer authenticated:
      persisting as a pending request at the server, the request from the client; and
      in an event that the session is subsequently re-authenticated, the server processing the pending request.

2. The method of claim 1 wherein the determining comprises verifying an authentication token associated with the client.

3. The method of claim 2 wherein the verifying comprises verifying that the authentication token has not timed out.

4. The method of claim 2 wherein the authentication token is a cookie stored by the client.

5. The method of claim 2 wherein the authentication token is part of the request received from the client.

6. The method of claim 2 wherein the authentication token is encrypted.

7. The method of claim 1 wherein persisting the request comprises storing the request in a file.

8. The method of claim 1 wherein persisting the request comprises storing the request in a database.

9. The method of claim 1 further comprising, after persisting the request, directing the client to re-authenticate the session.

10. The method of claim 9 wherein directing the client to authenticate the session comprises:
    directing the client to a login module; and
    directing the client to an address associated with the pending request.

11. The method of claim 10 wherein the address associated with the pending request is a URL.

12. A method comprising:
    authenticating a session between a server and a client, wherein the session is established via a network connection between the server and the client;
    the client submitting a request to the server via the session;

subsequent to submitting the request, the client receiving an indication that the session is no longer authenticated; the client obtaining re-authentication of the session; and the client receiving an indication that the request has been processed, without the client resubmitting the request.

13. A server system comprising:
an authentication verifier configured to determine whether an initially authorized session between the server and a client is still authorized;
a client interface configured to receive a request from the client via the session;
a pending request store configured to maintain the request in an event that the session is not authorized; and
a processing unit configured to process the request that is maintained in an event that the session is re-authorized.

14. The system of claim 13 further comprising an authentication redirect generator configured to generate an instruction to redirect the client to obtain re-authorization for the session.

15. The system of claim 14 wherein the instruction is a URL.

16. The system of claim 14 wherein the authorization is an authentication token.

17. An application server comprising the server system as recited in claim 13.

18. A server computing system comprising:
a client interface configured to receive a request from a client, wherein the request is received via a network connection between the client and the server computing system;
an authentication token verifier configured to determine whether an authentication token associated with the client is valid, wherein the network connection between the client and the server computing system remains active;
a pending request store configured to store the request in an event that the network connection between the client and the server computing system remains active, but the authentication token associated with the client is not valid; and
an authentication redirect generator configured to generate an instruction to redirect the client to obtain a valid authentication token while maintaining the network connection between the client and the server computing system.

19. The system of claim 18 wherein the authentication token verifier is further configured to determine whether the authentication token has expired.

20. The system of claim 18 wherein the authentication redirect generator is further configured to direct the client to access the request that is stored.

21. The system of claim 18 wherein the pending request store is a database.

22. A server system comprising:
means for receiving a request from a client, wherein the request is received via a network connection between the server system and the client;
means for determining whether an authentication token associated with the client is valid, while the network connection between the server system and the client remains active;
means for storing the request in an event that the authentication token is not valid; and
means for generating an instruction to redirect the client to obtain a valid authentication token, wherein the instruction is to be transmitted to the client via the network connection.

23. A system comprising:
a client;
an application server configured to:
establish a session between the application server and the client;
authenticate the session;
receive a request from the client, via the session;
maintain the request as a pending request in an event that the session is no longer authenticated; and
direct the client to re-authenticate the session;
the client being configured to re-authenticate the session by obtaining authentication from an authentication entity in response to direction from the application server, and the client further configured to subsequently access the pending request; and
upon client access to the pending request, the application server being further configured to process the pending request.

24. The system of claim 23 wherein the application server and the authentication entity are implemented as one server.

25. One or more computer-readable media comprising computer executable instructions that, when executed, direct a computing system to:
establish a network connection between the computing system and a client;
authenticate the client via the network connection;
subsequent to authenticating the client, receive a request from the client, wherein the request is received via the network connection;
subsequent to receiving the request, determine whether the client is still authenticated;
in an event the client is still authenticated, process the request; and
in an event that the client is no longer authenticated:
persist the request; and
in an event that the client is subsequently re-authenticated, process the request that is persisted.

26. The one or more computer-readable media of claim 25 further comprising computer executable instructions that, when executed, direct the computing system to:
in the event that the client is no longer authenticated, redirect the client to re-obtain authentication; and
direct the client to the request that is persisted.

27. One or more computer-readable media comprising computer executable instructions that, when executed, direct a computing system to:
establish a communication session between the computing system and a client;
determine that an authentication token associated with the client is valid;
receive via the communication session, a request from the client;
determine whether the authentication token is still valid;
if the authentication token is no longer valid:
store the request;
generate an instruction to redirect the client; and
transmit the instruction to the client via the communication session.

28. The one or more computer-readable media of claim 27 wherein the instruction comprises an instruction to redirect the client to obtain a valid authentication token.

29. The one or more computer-readable media of claim 28 wherein the instruction further comprises an instruction to redirect the client to the request that is stored upon the client obtaining the valid authentication token.

* * * * *

UNITED STATES PATENT AND TRADEMARK OFFICE
CERTIFICATE OF CORRECTION

PATENT NO. : 7,318,234 B1
APPLICATION NO. : 10/081755
DATED : January 8, 2008
INVENTOR(S) : Baskaran Dharmarajan Page 1 of 1

It is certified that error appears in the above-identified patent and that said Letters Patent is hereby corrected as shown below:

In column 6, line 25, in Claim 1, delete "session," and insert -- session; --, therefor.

In column 6, line 56, in Claim 10, delete "authenticate" and insert -- re-authenticate --, therefor.

Signed and Sealed this

Eighth Day of February, 2011

David J. Kappos
*Director of the United States Patent and Trademark Office*